United States Patent
Shinohara et al.

(10) Patent No.: US 9,732,242 B2
(45) Date of Patent: Aug. 15, 2017

(54) INK JET RECORDING INK

(71) Applicant: FUJIFILM CORPORATION, Minato-ku, Tokyo (JP)

(72) Inventors: Ryuji Shinohara, Kanagawa (JP); Yuko Saito, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 15/188,985

(22) Filed: Jun. 22, 2016

(65) Prior Publication Data

US 2016/0297980 A1 Oct. 13, 2016

Related U.S. Application Data

(63) Continuation of application No. PCT/JP2015/052580, filed on Jan. 29, 2015.

(30) Foreign Application Priority Data

Jan. 31, 2014 (JP) ................. 2014-017911

(51) Int. Cl.
| | | |
|---|---|---|
| C09D 11/328 | (2014.01) | |
| C09D 11/30 | (2014.01) | |
| C09B 29/16 | (2006.01) | |
| C09B 29/30 | (2006.01) | |
| C09B 33/18 | (2006.01) | |
| C09B 33/30 | (2006.01) | |
| B41J 2/01 | (2006.01) | |
| C09D 11/38 | (2014.01) | |
| C09B 62/04 | (2006.01) | |

(52) U.S. Cl.
CPC ............... *C09D 11/328* (2013.01); *B41J 2/01* (2013.01); *C09D 11/38* (2013.01); *C09B 29/30* (2013.01); *C09B 33/18* (2013.01); *C09B 33/30* (2013.01); *C09B 62/04* (2013.01)

(58) Field of Classification Search
CPC ..... C09D 11/328; C09D 11/30; C09B 39/103; C09B 29/16; C09B 29/30; C09B 33/18; C09B 33/30; C09B 29/103
USPC ................. 106/31.51, 31.52, 31.58
See application file for complete search history.

(56) References Cited

U.S. PATENT DOCUMENTS

| | | | | |
|---|---|---|---|---|
| 5,560,770 A * | 10/1996 | Yatake | ............. | C09D 11/30 106/31.58 |
| 5,746,818 A * | 5/1998 | Yatake | ............. | C09D 11/30 106/31.52 |
| 5,952,414 A * | 9/1999 | Noguchi | ............. | C09D 11/30 523/161 |
| 6,001,899 A * | 12/1999 | Gundlach | ............. | C09D 11/30 106/31.43 |
| 6,004,389 A * | 12/1999 | Yatake | ............. | C09D 11/30 106/31.52 |

(Continued)

FOREIGN PATENT DOCUMENTS

| | | | |
|---|---|---|---|
| JP | H1-110577 A | | 4/1989 |
| JP | 03/014881 | * | 1/1991 |
| JP | H8-170041 A | | 7/1996 |
| JP | 08/283631 | * | 10/1996 |
| JP | H11-323218 A | | 11/1999 |
| JP | 2002-003764 A | | 1/2002 |
| JP | 2008/138064 | * | 6/2008 |

OTHER PUBLICATIONS

English translation of the Written Opinion of the International Search Authority mailed Apr. 14, 2015 for PCT/JP2015/052580; 5 pages.*

(Continued)

*Primary Examiner* — Helene Klemanski
(74) *Attorney, Agent, or Firm* — Solaris Intellectual Property Group, PLLC

(57) ABSTRACT

The present invention provides an ink jet recording ink including a dye which has a weight average molecular weight of 850 or less and is represented by Formula (1) below, a water-soluble organic solvent which has an SP value of 9.4 or more and less than 9.75 and is represented by Formula (2) or (3) below, and water, in which the content of a surfactant is less than 0.1% by mass. $R_1$, $R_2$: H, a halogen atom, OH, COOH, C1-C6 alkyl group, C1-C6 alkoxy group, $NO_2$, an azophenyl group, -L1-Ra and the like, $L_1$: O, $CH_2$, $C_6H_4$, N=N, $SO_2$ or a combination thereof, Ra: a phenyl group, a naphthyl group, or the like, $R_3$: H, an azophenyl group, an azonaphthalene group, $-L_2$-Rb or the like, $L_2$: C(=O), $C_6H_4$, N=N, NH, $SO_2$ or a combination thereof, Rb: a phenyl group, a naphthyl group, a pyrimidyl group, or the like; $M^+$: $H^+$, $Na^+$, $NH_4^+$, an alkylammonium ion or the like, R: C2-C6 unsubstituted alkyl group, and n is 1 to 3.

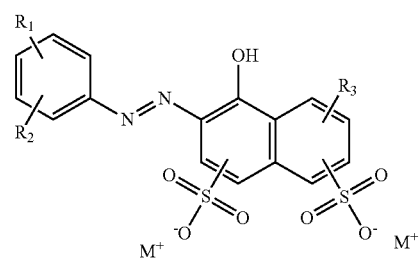

Formula (1)

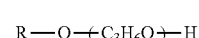

Formula (2)

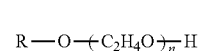

Formula (3)

17 Claims, No Drawings

(56) References Cited

U.S. PATENT DOCUMENTS

| | | | | |
|---|---|---|---|---|
| 6,054,505 A | * | 4/2000 | Gundlach | C09D 11/328 523/160 |
| 6,375,728 B2 | * | 4/2002 | Yamashita | C09D 11/322 106/31.6 |
| 6,461,418 B1 | * | 10/2002 | Yue | C09D 11/30 106/31.58 |
| 6,508,870 B1 | * | 1/2003 | Komatsuzawa | C09D 11/16 106/31.58 |
| 6,676,735 B2 | * | 1/2004 | Oki | C09D 11/38 106/31.58 |
| 6,743,284 B2 | * | 6/2004 | Norimatsu | C09D 11/38 106/31.58 |
| 2002/0009547 A1 | * | 1/2002 | Ito | B41M 7/0027 427/337 |

OTHER PUBLICATIONS

Search Report mailed Apr. 14, 2015 for PCT/JP2015/052580; 2 pages.*
English translation of JP 2008/138064; Jun. 2008; 18 pages.*
English translation of JP 08/283631; Oct. 1996; 12 pages.*
English translation of JP 03/014881; Jan. 1991; 5 pages.*
Reactive Red 6 structural formula; http://www.worlddyevariety.com/reactive-dyes/reactive-red-6.html; no date available; 5 pages.*
Direct Black 154 structural formula; http://www.worlddyevariety.com/direct-dyes/direct-black-154.html; no date available; 5 pages.*
Direct Black 19 structural formula; http://www.worlddyevariety.com/direct-dyes/direct-black-19.html; no date available; 7 pages.*
Acid Red 249 (Polar Brilliant Red B) structural formula; AldrichCPR; Sigma-Aldrich; http://www.sigmaaldrich.com/catalog/product/aldrich/r323357?lang=en&region=US; no date available; 2 pages.*
English translation of JP 01/110577, Apr. 1998; 7 pages.*
Adeka Carpoll ML 250 data sheet; https://hazmap.nlm.nih.gov/category-details?table=copytblagents&id=6766; no date available; 2 pages.*
English language translation of the following: Office action dated Aug. 23, 2016 from the JPO in a Japanese patent application No. 2014-017911 corresponding to the instant patent application. The office action translation is submitted now in order to supplement the understanding of the cited references which are being disclosed in the instant Information Disclosure Statement.
Extended European Search Report dated Jan. 2, 2017, issued in corresponding EP Patent Application No. 15742729.5.

* cited by examiner

INK JET RECORDING INK

CROSS-REFERENCE TO RELATED APPLICATION

This application is a Continuation of PCT International Application No. PCT/JP2015/052580, filed Jan. 29, 2015, which claims priority under 35 U.S.C. §119(a) to Japanese Patent Application No. 2014-017911 filed Jan. 31, 2014. Each of the above applications is hereby expressly incorporated by reference, in its entirety, into the present application.

BACKGROUND OF THE INVENTION

1. Field of the Invention

The present invention relates to an ink jet recording ink.

2. Description of the Related Art

In recent years, image forming techniques employing an ink jet method for the purpose of use in photographs and offset printing, in which formation of high definition images is required, have been proposed. Therefore, there is a demand for the ink jet method to have a capability of forming high quality images at a high speed.

In recent years, there has been a tendency of an increasing demand for high speed image formation. For example, in a system that renders images at a high speed using roll paper, jettability of ink and rub resistance of images after rendering have become important. In a case in which the rub resistance of images is low, when sheets of roll paper with rendered images are stacked upon each other within a short time after rendering, the sheets of paper come into contact with the images, which are abraded, there are cases in which the images become blurred and as a result, the images lose their product values. Thus, investigations for improvement have been carried out.

JP1999-323218A (JP-H11-323218A) discloses an ink composition including water, an anionic dye, and a polyquaternary amine compound as an ink composition for ink jet printing having excellent smear resistance and water resistance.

In addition, JP2002-003764A provides a printed material having excellent printing quality and light fastness and discloses aqueous ink containing a coloring material, a water-soluble organic solvent which is in the form of a liquid at a temperature of 40° C. or lower, has a solubility of 1% by weight or more in water at a temperature of 20° C., and has a saturated vapor pressure of 1.7 Pa or less at a temperature of 20° C., and a nitrogen-containing cyclic compound as an aqueous ink exhibiting high storage stability and excellent jetting reliability.

SUMMARY OF THE INVENTION

As means for improving jettability of ink, there is a technique of reducing the molecular weight of a dye included in ink. In this case, while jettability is improved, a phenomenon in which ink passes through a recording medium (for example, paper) as time passes and diffuses to the rear surface of the paper (strike-through) is noticeably exhibited. Therefore, simply reducing the molecular weight of a dye consequently leads to a problem of an inability of rendering images on both surfaces. Such a phenomenon is likely to occur particularly in paper into which ink can easily permeate, for example, plain paper having a basis weight of 110 g/m² or less, and becomes apparent in plain paper having a basis weight of 90 g/m² or less. This phenomenon more noticeably occurs under a high temperature and a high humidity.

The present invention has been made in consideration of the above circumstances and is to achieve the following object.

That is, an object of the present invention is to provide an ink jet recording ink having excellent jettability and with which strike-through is able to be suppressed.

<1> An ink jet recording ink comprising: a dye which has a weight average molecular weight of 850 or less and is represented by Formula (1) below; a water-soluble organic solvent which has an SP value of 9.4 or more and less than 9.75 and is represented by Formula (2) or (3) below; and water, wherein the content of a surfactant is less than 0.1% by mass.

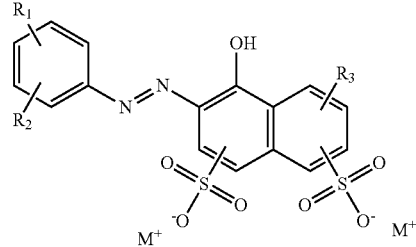

Formula (1)

In Formula (1), $R_1$ and $R_2$ each independently represent a monovalent group selected from a hydrogen atom, a halogen atom, a hydroxyl group, a carboxy group, an alkyl group having 1 to 6 carbon atoms, an alkoxy group having 1 to 6 carbon atoms, a sulfo group, a nitro group, an anilino group, an acetamide group, a phosphate group, an azophenyl group, an azonaphthalene group, and $-L_1$-Ra. $L_1$ represents a bivalent linking group consisting of one or a combination of two to five selected from $-O-$, $-CH_2-$, $-C_6H_4-$, $-N=N-$, and $-SO_2-$.

Ra represents a phenyl group, a naphthyl group, or a sulfo group.

$R_3$ represents a monovalent group selected from a hydrogen atom, an amino group, an acetamide group, an azophenyl group, an azonaphthalene group, and $-L_2$-Rb.

$L_2$ represents a bivalent linking group consisting of one or a combination of two to five selected from $-C(=O)-$, $-C_6H_4-$, $-N=N-$, $-NH-$, and $-SO_2-$.

Rb represents a phenyl group, a naphthyl group, a pyrimidyl group, a triazinyl group, or a quinoxaline group.

$M^+$ represents a hydrogen ion, a sodium ion, a potassium ion, a lithium ion, an ammonium ion, or an alkylammonium ion.

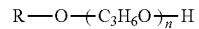

Formula (2)

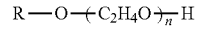

Formula (3)

In Formulae (2) and (3), R represents an unsubstituted alkyl group having 2 to 6 carbon atoms. n represents an integer of 1 to 3.

<2> The ink jet recording ink according to <1>, wherein the content of the water-soluble organic solvent represented by Formula (2) or (3) is 0.1% by mass to 4.5% by mass with respect to the total mass of the ink.

<3> The ink jet recording ink according to <1> or <2>, wherein the dye represented by Formula (1) is a monoazo dye.

<4> The ink jet recording ink according to any one of <1> to <3>, wherein the dye represented by Formula (1) has a weight average molecular weight of 650 to 850.

<5> The ink jet recording ink according to any one of <1> to <4>, wherein in Formula (1), $R_1$ represents a hydrogen atom, a methyl group, a nitro group, an anilino group, an acetamide group, —O—$C_6H_5$, or —O—$CH_2$—$C_6H_5$, and $R_2$ represents a hydrogen atom or a halogen atom.

<6> The ink jet recording ink according to any one of <1> to <5>, wherein in Formula (1), $R_3$ represents —NH—$SO_2$—$C_6H_5$ or —NH—$SO_2$—$C_6H_4$—$CH_3$.

<7> The ink jet recording ink according to any one of <1> to <6>, wherein in Formula (1), $M^+$ is a sodium ion.

<8> The ink jet recording ink according to any one of <1> to <4>, wherein the dye represented by Formula (1) is a compound represented by Formula (1a) below.

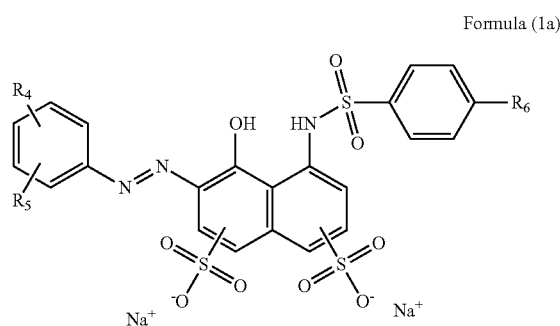

Formula (1a)

In Formula (1a), $R_4$ and $R_5$ each independently represent a monovalent group selected from a hydrogen atom, a halogen atom, a methyl group, a phenoxy group, a nitro group, an acetamide group, and a phenylmethoxy group.

$R_6$ represents a hydrogen atom or a methyl group.

<9> The ink jet recording ink according to any one of <1> to <8>, wherein the content of the water-soluble organic solvent represented by Formula (2) or (3) is 5 parts by mass to 200 parts by mass with respect to 100 parts by mass of the dye.

<10> The ink jet recording ink according to any one of <1> to <9>, wherein the content of the water-soluble organic solvent represented by Formula (2) or (3) is 10 parts by mass to 150 parts by mass with respect to 100 parts by mass of the dye.

<11> The ink jet recording ink according to any one of <1> to <10>, further comprising: an organic solvent other than the water-soluble organic solvent represented by Formula (2) or (3), wherein the content of the water-soluble organic solvent represented by Formula (2) or (3) is 1% by mass to 40% by mass with respect to the total mass of the organic solvents.

<12> The ink jet recording ink according to any one of <1> to <11>, further comprising: an organic solvent other than the water-soluble organic solvent represented by Formula (2) or (3), wherein the content of the water-soluble organic solvent represented by Formula (2) or (3) is 1.2% by mass to 25% by mass with respect to the total mass of the organic solvents.

<13> The ink jet recording ink according to any one of <1> to <12>, wherein the water-soluble organic solvent represented by Formula (2) or (3) has an SP value of 9.6 or more and 9.7 or less.

<14> The ink jet recording ink according to any one of <1> to <13>, wherein the water-soluble organic solvent represented by Formula (2) or (3) is dipropylene glycol monobutyl ether, diethylene glycol monohexyl ether, tripropylene glycol monoethyl ether, propylene glycol monohexyl ether, or tripropylene glycol monohexyl ether.

According to the present invention, there is provided an ink jet recording ink having excellent jettability and with which strike-through is able to be suppressed.

DESCRIPTION OF THE PREFERRED EMBODIMENTS

Hereinafter, an ink jet recording ink of the present invention will be described.

In the specification, the numerical range represented by the term "to" indicates a range including the numerical values set forth before and after "to" as the minimum value and the maximum value, respectively.

<Ink Jet Recording Ink>

An ink jet recording ink of the present invention (hereinafter, also simply referred to as "ink") includes a dye which has a weight average molecular weight of 850 or less and is represented by Formula (1) (hereinafter, also referred to as a "specific dye"), a water-soluble organic solvent which has an SP value of 9.4 or more and less than 9.75 and is represented by Formula (2) or (3) (hereinafter, also referred to as a "specific organic solvent"), and water, and the content of a surfactant is less than 0.1% by mass.

The ink of the present invention can contain other additives within a range not impairing the effect of the present invention, as required.

Although the mechanism of action of the present invention is not clear, the present inventors assume as follows.

That is, in the related art, in a case of using a dye having a weight average molecular weight of 850 or less as a dye to be included in the ink, while the jettability of the ink is improved, strike-through of the ink may occur as time passes. The present inventors have found that in the case in which the ink includes 0.1% by mass or more of a surfactant, the occurrence of strike-through of the ink becomes noticeable as time passes.

It is considered that since the ink of the present invention includes both a dye having an specific structure and a water-soluble organic solvent with an specific structure having an SP value of 9.4 or more and less than 9.75 even in the case in which the weight average molecular weight of the dye is 850 or less, a high quality image can be recorded and strike-through can be suppressed while maintaining satisfactory jettability.

Hereinafter, each component of the ink jet recording ink of the present invention will be described.

<<Dye>>

The ink jet recording ink of the present invention includes at least one dye having a weight average molecular weight of 850 or less and represented by Formula (1) below. This dye is preferably a water-soluble dye. The term "water-soluble" used herein means that the dye is dissolved in 100 g of water at 25° C. in an amount of 5% by mass or more.

The ink of the present invention includes the dye represented by Formula (1) below and strike-through of the ink can be suppressed by incorporating both the dye and the specific organic solvent.

The dye of the present invention may be used alone or in combination of two or more.

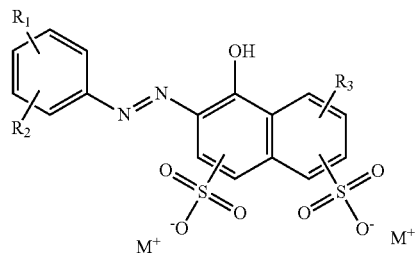

Formula (1)

In Formula (1), $R_1$ and $R_2$ each independently represent a monovalent group selected from a hydrogen atom, a halogen atom, a hydroxyl group, a carboxy group, an alkyl group having 1 to 6 carbon atoms, an alkoxy group having 1 to 6 carbon atoms, a sulfo group, a nitro group, an anilino group, an acetamide group, a phosphate group, an azophenyl group, an azonaphthalene group, and -$L_1$-Ra.

Examples of the halogen atom include a chlorine atom, a fluorine atom, and a bromine atom.

Examples of the alkyl group include a methyl group, an ethyl group, a n-butyl group, an i-butyl group, a t-butyl group, a pentyl group, a hexyl group and a phenyl group, and an alkyl group having 1 to 3 carbon atoms is preferable.

Examples of the alkoxy group include a methoxy group, an ethoxy group, a propoxy group, a butoxy group, a pentoxy group, a hexyloxy group and a phenoxy group, and an alkoxy group having 1 to 3 carbon atoms is preferable.

In Formula (1), $L_1$ represents a bivalent linking group consisting of one or a combination of two to five selected from —O—, —$CH_2$—, —$C_6H_4$—, —N=N—, and —$SO_2$—. As $L_1$, combinations of the same plural groups may be used and combinations of two or more groups may be used. Examples of $L_1$ include —O—$CH_2$—, —N=N—$C_6H_4$—, —$C_6H_4$—N=N—, —$C_6H_4$—N=N—$C_6H_4$—, and —$SO_2$—$CH_2$—$CH_2$—O—.

In Formula (1), Ra represents a phenyl group, a naphthyl group, or a sulfo group. Ra is preferably a phenyl group.

Examples of "-$L_1$-Ra" include —O—$C_6H_5$, —O—$CH_2$—$C_6H_5$, —O—$C_6H_3(NH_2)_2$, and —N=N—$C_6H_3(NH_2)_2$.

Among these, $R_1$ is preferably a hydrogen atom, a methyl group, a nitro group, an anilino group, an acetamide group, —O—$C_6H_5$, or —O—$CH_2$—$C_6H_5$, and $R_2$ is preferably a hydrogen atom or a halogen atom.

Examples of the halogen atom include a chlorine atom, a fluorine atom, and a bromine atom.

In Formula (1), $R_3$ represents a monovalent group selected from a hydrogen atom, an amino group, an acetamide group, an azophenyl group, an azonaphthalene group, and -$L_2$-Rb.

In Formula (1), $L_2$ represents a bivalent linking group consisting of one or a combination of two to five selected from —C(=O)—, —$C_6H_4$—, —N=N—, —NH—, and —$SO_2$—. As $L_2$, combinations of the same plural groups may be used and combinations of two or more groups may be used. Examples of $L_2$ include —N=N—$C_6H_4$—, —N=N—$C_6H_4$—$C_6H_4$—N=N—, and —NH—$SO_2$—.

Rb represents a phenyl group, a tolyl group, a naphthyl group, a pyrimidyl group, a triazinyl group, or a quinoxaline group. Rb is preferably a phenyl group or a tolyl group.

Among these, $R_3$ is preferably —NH—$SO_2$—$C_6H_5$ or —NH—$SO_2$—$C_6H_4$—$CH_3$.

In Formula (1), $M^+$ represents a hydrogen ion, a sodium ion, a potassium ion, a lithium ion, an ammonium ion, or an alkylammonium ion.

Examples of "-$L_2$-Rb" include —NH—$SO_2$—$C_6H_5$, —NH—$SO_2$—$C_6H_4$—$CH_3$, —N=$C_6H_5$—$NO_2$, —N=N—$C_6H_5$—$NH_2$, and —N=N—$C_6H_4$—$Cl_2$.

An alkyl group, an alkoxy group, an azophenyl group, and an azonaphthalene group represented by $R_1$ and $R_2$, a phenyl group and a naphthyl group represented by Ra, an azophenyl group, and an azonaphthalene group represented by $R_3$, and a phenyl group, a naphthyl group, a pyrimidyl group, a triazinyl group, and a quinoxaline group represented by Rb may be unsubstituted or may have a substituted group, respectively.

Examples of the substituted group include linear or branched alkyl groups having 1 to 12 carbon atoms (for example, methyl, ethyl, propyl, isopropyl, sec-butyl, t-butyl, 2-ethylhexyl, 2-methyl sulfonylethyl, 3-phenoxypropyl, trifluoromethyl, and cyclopentyl), linear or branched aralkyl groups having 7 to 18 carbon atoms, linear or branched alkenyl groups having 2 to 12 carbon atoms, linear or branched alkynyl groups having 2 to 12 carbon atoms, linear or branched cycloalkyl groups having 3 to 12 carbon atoms, linear or branched cycloalkenyl groups having 3 to 12 carbon atoms, halogen atoms (for example, chlorine atom, and bromine atom), aryl groups (for example, phenyl, 4-t-butylphenyl, and 2,4-di-t-amylphenyl), hetero 2-pyrimidinyl group, 2-benzothiazolyl group, cyano group, hydroxyl group, nitro group, carboxy group, amino group, alkyloxy groups (for example, methoxy, ethoxy, 2-methoxyethoxy, and 2-methylsulfonylethoxy), aryloxy groups (for example, phenoxy, 2-methylphenoxy, 4-t-butylphenoxy, 3-nitrophenoxy, 3-t-butyloxycarbonylphenoxy, and 3-methoxycarbonylphenyloxy), acylamino groups (for example, acetamide, benzamide, and 4-(3-t-butyl-4-hydroxyphenoxy)butaneamide), alkylamino groups (for example, methylamino, butylamino, diethylamino, and methylbutylamino), anilino groups (for example, 2-chloroanilino), ureido groups (for example, phenylureido, methylureido, and N,N-dibutylureido), sulfamoylamino groups (for example, N,N-dipropylsulfamoylamino), alkylthio groups (for example, methylthio, octylthio, and 2-phenoxyethylthio), arylthio groups (for example, phenylthio, 2-butoxy-5-t-octylphenylthio, 2-carboxyphenylthio), alkyloxycarbonylamino groups (for example, methoxycarbonylamino), alkylsulfonylamino groups and aryl sulfonyl amino groups (for example, methyl sulfonyl amino, phenylsulfonylamino, and p-toluenesulfonylamino), carbamoyl groups (for example, N-ethylcarbamoyl, and N,N-dibutylcarbamoyl), sulfamoyl groups (for example, N-ethylsulfamoyl, N,N-dipropylsulfamoyl, and N-phenylsulfamoyl), sulfonyl groups (for example, methyl sulfonyl, octylsulfonyl, phenylsulfonyl, and p-toluenesulfonyl), alkyloxycarbonyl groups (for example, methoxycarbonyl, and butyloxycarbonyl), heterocyclic oxy groups (for example, 1-phenyltetrazol-5-oxy, and 2-tetrahydropyranyloxy), azo groups (for example, phenylazo, 4-methoxyphenylazo, 4-pivaloylaminophenylazo, and 2-hydroxy-4-propanoylphenylazo), acyloxy groups (for example, acetoxy), carbamoyloxy groups (for example, N-methylcarbamoyloxy, and N-phenylcarbamoyloxy), silyloxy groups (for example, trimethylsilyloxy, and dibutylmethylsilyloxy), aryloxycarbonylamino groups (for example, phenoxycarbonylamino), imide groups (for example, N-succinimide, and N-phthalimide), heterocyclic thio groups (for example, 2-benzothiazolylthio, 2,4-di-phenoxy-1,3,5-triazole-6-thio, and 2-pyridylthio), sulfinyl groups (for example, 3-phenoxypropylsulfinyl), phosphonyl groups (for example, phenoxyphosphonyl, octyloxyphosphonyl, and phenylphosphonyl), aryloxycarbonyl groups (for example, phenoxycarbonyl), acyl groups (for example, acetyl, 3-phenylpropanoyl, and benzoyl), and ionic hydrophilic groups (for example, carboxy group, sulfo group, phosphono group, and quaternary ammonium group).

In the dye represented by Formula (1), it is more preferable that $R_1$ represents a hydrogen atom, a methyl group, a nitro group, an anilino group, an acetamide group, —O—$C_6H_5$ or —O—$CH_2$—$C_6H_5$, $R^2$ represents a hydrogen atom or a halogen atom, $R_3$ represents —NH—$SO_2$—$C_6H_5$ or —NH—$SO_2$—$C_6H_4$—$CH_3$, and $M^+$ represents a sodium ion.

Specific examples of the dye in the present invention include C.I. 17230, 20485, and 20496, C.I. Acid Black 1, 28, 32, 41, 234, and 241, C.I. Acid Blue 29, and 73, C.I. Acid Brown 121, C.I. Acid Green 19 and 20, C.I. Acid Red 1, 33, 35, 76, 106, 138, 172, 249, and 265, C.I. Acid Violet 5, 7, and 12, C.I. Direct Black 4, 19, 38, 154, and 166, C.I. Direct Blue 2 and 295, C.I. Direct Brown 52, C.I. Direct Green 1, 6, 8, and 85, C.I. Mordant Blue 18, C.I. Mordant Green 17 and 28, C.I. Reactive Blue 81, C.I. Reactive Red 1, 2, 3, 17, 24, 24:1, 41, 45, 88, and 177, C.I. Reactive Violet 4, and Projet Magenta 432, which are suitably used.

The dye in the present invention is preferably a monoazo dye from the viewpoint of suppressing strike-through of the ink.

Specific examples of the monoazo dye to be suitably used include C.I. 17230, C.I. Acid Red 1, 33, 35, 76, 106, 138, 172, 249, and 265, C.I. Acid Violet 5, 7, and 12, C.I. Direct Blue 2 and 295, C.I. Direct Brown 52, C.I. Mordant Blue 18, C.I. Mordant Green 17 and 28, C.I. Reactive Blue 81, C.I. Reactive Red 1, 2, 3, 17, 24, 24:1, 41, 45, 88, and 177, C.I. Reactive Violet 4, and Projet Magenta 432.

Further, the dye to be included in the ink of the present invention is more preferably a compound represented by Formula (1a) below from the viewpoint of suppressing strike-through of the ink.

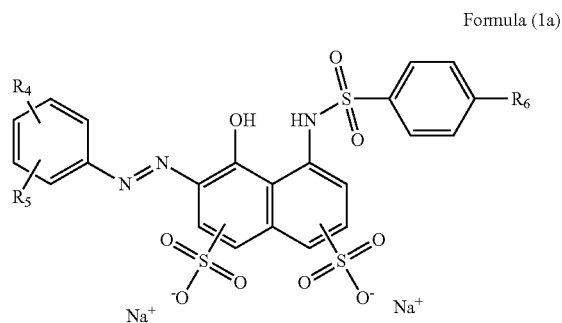

Formula (1a)

In Formula (1a), $R_4$ and $R_5$ each independently represent a monovalent group selected from a hydrogen atom, a halogen atom, a methyl group, a phenoxy group, a nitro group, an acetamide group, and a phenylmethoxy group. $R_4$ is preferably a hydrogen atom, an acetamide group, or a phenoxy group and $R_5$ is preferably a hydrogen atom or a halogen atom.

Examples of the halogen atom include a chlorine atom, a fluorine atom, and a bromine atom.

$R_6$ represents a hydrogen atom or a methyl group.

Specific examples of the dye represented by Formula (1a) include C.I. Acid Red 106, 172, 249, and 265, and C.I. Acid Violet 5.

The weight average molecular weight (Mw) of the dye of the present invention is 850 or less. When the weight average molecular weight of the dye is more than 850, the solubility of the dye in water is degraded and the jettability of the ink tends to deteriorate.

The weight average molecular weight of the dye is preferably 650 to 850 and more preferably 700 to 800 from the viewpoint of attaining ink jettability and suppressing strike-through.

The weight average molecular weight of the dye is measured by gel permeation chromatography (GPC). GPC is carried out by using HLC-8020GPC (manufactured by Tosoh Corporation), three columns of TSKgel, Super Multipore HZ-H (manufactured by Tosoh Corporation, 4.6 mm ID×15 cm), and tetrahydrofuran (THF) as an eluent. In addition, the measurement is carried out using a differential refractive index (RI) detector under the conditions of a sample density of 0.45% by mass, a flow rate of 0.35 ml/min, a sample injection amount of 10 μl, and a measurement temperature of 40° C. In addition, a calibration curve is prepared based on eight samples of "standard sample: TSK standard, polystyrene" of "F-40", "F-20", "F-4", "F-1", "A-5000", "A-2500", "A-1000", and "n-propylbenzene" manufactured by Tosoh Corporation.

The content of the dye in the ink of the present invention is preferably 10% by mass or less and more preferably 5% by mass or less with respect to the total mass of the ink from the viewpoint of improvement of image quality and the storage stability of the ink.

In the ink of the present invention, for the purpose of adjusting hue, adjusting a color fading rate, and the like, other coloring materials (dyes and pigments) may be used together with the above-described dye within a range of not impairing the effect of the present invention. Examples of the dye that can be used together with the above-described dye include the followings.

As a yellow dye, any yellow dye can be used. Examples of the yellow dye include aryl or heteryl azo dyes having a phenol, a naphthol, an aniline, a hetero-cyclic ring (for example, pyrazolone and pyridone), an open chain-type active methylene compound and the like as a coupling component (hereinafter referred to as a "coupler component"); azomethine dyes having an open chain-type active methylene compound and the like as the coupler component; methine dyes, for example, benzylidene dye and monomethine oxonol dye; and quinone dyes, for example, naphthoquinone dye and anthraquinone dye. Other examples of the dye species include quinophthalone dye, nitro-nitroso dye, acridine dye and acridinone dye.

As a magenta dye, any magenta dye can be used. Examples of the magenta dye include aryl or heteryl azo dyes having a phenol, a naphthol, an aniline and the like as the coupler component; azomethine dyes having a pyrazolone, a pyrazolotriazole and the like as the coupler component; methine dyes, for example, arylidene dye, styryl dye, merocyanine dye, cyanine dye and oxonol dye; carbonium dyes, for example, diphenylmethane dye, triphenylmethane dye and xanthene dye; quinone dyes, for example, naphthoquinone, anthraquinone and anthrapyridone; and condensed polycyclic dyes, for example, dioxazine dye.

As a cyan dye, any cyan dye can be used. Examples of the cyan dye include aryl or heteryl azo dyes having a phenol, a naphthol, an aniline and the like as the coupler component; azomethine dyes having a phenol, a naphthol, a heterocyclic ring (for example, pyrrolotriazole) and the like as the coupler component; polymethine dyes, for example, cyanine dye, oxonol dye and merocyanine dye; carbonium dyes, for example, diphenylmethane dye, triphenylmethane dye and xanthene dye; phthalocyanine dyes; anthraquinone dyes; and indigo-thioindigo dyes.

Each dye may be a dye, which provides a yellow, magenta or cyan color for the first time when a part of the chromophore is dissociated. In this case, the counter cation may be an inorganic cation, for example, alkali metal or ammonium, or an organic cation, for example, pyridinium and quaternary ammonium salt. Further, the counter cation may be a polymer cation having such a cation as a partial structure.

Examples of black coloring material used include disazo, trisazo and tetraazo dyes and a dispersion of carbon black.

In addition, examples of a dye that can be suitably used together with the dye in the present invention include compounds described in paragraphs "0473" to "0481" (yellow dyes), paragraphs "0570" to "0578" (magenta dyes), paragraphs "0660" to "0664" (cyan dyes), and paragraphs "0779" to "0792" (compounds to be used for a black ink composition) of JP2007-138124A.

<<Water-Soluble Organic Solvent>>

The ink of the present invention includes at least one water-soluble organic solvent (specific organic solvent) having an SP value of 9.4 or more and less than 9.75 and represented by Formula (2) or (3) below. When the ink of the present invention includes the specific organic solvent, strike-through of the ink is suppressed.

The ink of the present invention may include another organic solvent in addition to the above specific organic solvent.

When the SP value of the specific organic solvent is less than 9.4, the jetting stability of the ink deteriorates and when the SP value is 9.75 or more, strike-through of the ink deteriorates.

The SP value is preferably 9.6 or more and 9.7 or less.

The term "water-soluble" used herein means that the compound is dissolved in 100 g of water at 25° C. in an amount of 5% by mass or more.

The SP value in the specification is a value calculated by an OKITSU method.

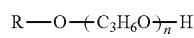

Formula (2)

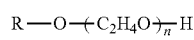

Formula (3)

In Formulae (2) and (3), R represents an unsubstituted alkyl group having 2 to 6 carbon atoms. Examples of the alkyl group include an ethyl group, a n-butyl group, an i-butyl group, a t-butyl group, a pentyl group, and a hexyl group. n represents an integer of 1 to 3.

In Formulae (2) and (3), when R is a methyl group having 1 carbon atom or an unsubstituted alkyl group having 7 or more carbon atoms, strike-through of the ink cannot be suppressed.

The number of carbon atoms of the unsubstituted alkyl group represented by R is particularly preferably 4 to 6.

In Table 1 below, the SP values of the compounds represented by Formulae (2) and (3) are shown together with the SP values of the compounds having 1 carbon atom, 7 carbon atoms, and 8 carbon atoms in R in Formulae (2) and (3).

TABLE 1

| | | Number of carbon atoms of R | | | | | | | |
|---|---|---|---|---|---|---|---|---|---|
| | | 1 carbon atom | 2 carbon atoms | 3 carbon atoms | 4 carbon atoms | 5 carbon atoms | 6 carbon atoms | 7 carbon atoms | 8 carbon atoms |
| Formula (2) | n = 1 | PGmME 10.4 | 10.2 | 9.9 | 9.85 | 9.73 | PGmHE 9.6 | 9.54 | PGmOE 9.47 |
| | n = 2 | 10 | 9.87 | 9.76 | DPGmBE 9.69 | 9.59 | 9.52 | 9.46 | 9.41 |
| | n = 3 | 9.79 | TPGmEE 9.7 | 9.63 | 9.56 | 9.5 | TPGmHE 9.45 | 9.41 | 9.37 |
| Formula (3) | n = 1 | 10.7 | 10.4 | 10.2 | 10 | 9.85 | 9.73 | 9.63 | 9.54 |
| | n = 2 | 10.4 | 10.2 | 10 | DEGmBE 9.87 | 9.76 | DEGmHE 9.67 | 9.59 | 9.52 |
| | n = 3 | 10.1 | 10 | 9.88 | 9.79 | 9.7 | 9.63 | 9.56 | 9.5 |

The abbreviations in Table 1 will be described.
PGmME: Propylene glycol monomethyl ether
TPGmE: Tripropylene glycol monoethyl ether
DPGmBE: Dipropylene glycol monobutyl ether
DEGmBE: Diethylene glycol monobutyl ether
PGmHE: Propylene glycol monohexyl ether
TPGmHE: Tripropylene glycol monohexyl ether
DEGmHE: Diethylene glycol monohexyl ether
PGmOE: Propylene glycol monooctyl ether The specific organic solvent in the present invention is preferably DPGmBE, DEGmHE, TPGmEE, PGmHE, or TPGmHE and particularly preferably DPGmBE, or DEGmHE from the viewpoint of suppressing strike-through of the ink.

The specific organic solvents may be used alone or in combination of two or more.

The content of the specific organic solvent of the present invention is preferably 0.1% by mass to 20% by mass, more preferably 0.1% by mass to 10% by mass, still more preferably 0.1% by mass to 4.5% by mass, and particularly preferably 0.5% by mass to 4.5% by mass with respect to the total mass of the ink.

When the content of the specific organic solvent with respect to the total mass of the ink is within the above range, strike-through of the ink can be further suppressed.

In addition, the content of the specific organic solvent in the ink of the present invention is preferably 5 parts by mass to 200 parts by mass and more preferably 10 parts by mass to 150 parts by mass with respect to 100 parts by mass of the dye.

When the content of the specific organic solvent with respect to 100 parts by mass of the dye is within the above range, strike-through of the ink can be further suppressed.

(Another Organic Solvent)

It is preferable that the ink of the present invention further includes another organic solvent in addition to the above-described specific organic solvent.

Hereinafter, preferable examples of another organic solvent (compound) will be shown. Examples of another organic solvent include glycols such as glycerin, 1,2,6-hexanetriol, trimethylolpropane, ethylene glycol, propylene glycol, diethylene glycol, triethylene glycol, tetraethylene glycol, pentaethylene glycol, dipropylene glycol, and tripropylene glycol; polyhydric alcohols such as alkane diols including 2-butene-1,4-diol, 2-ethyl-1,3-hexane diol, 2-methyl-2,4-pentanediol, 1,2-octanediol, 1,2-hexanediol, 1,2-pentanediol, and 4-methyl-1,2-pentanediol; sugar and sugar alcohols; hyaluronic acids; alkyl alcohols having 1 to 4 carbon atoms; and glycol ethers, described in paragraph "0116" of JP2011-42150A. One type or two or more types of these organic solvents may be used selectively as appropriate.

The polyhydric alcohols are also useful as anti-drying agents and wetting agents, and examples thereof include examples described in paragraph "0117" of JP2011-42150A. In addition, the polyol compounds are preferable as a penetration enhancer, and examples thereof include examples described in paragraph "0117" of JP2011-42150A as an aliphatic diol.

Examples of another organic solvent also include organic solvents described in paragraphs "0036" to "0039" of JP2009-190379A, organic solvents described in paragraphs "0176" to "0179" of JP2011-46872A, and organic solvents described in paragraphs "0063" to "0074" of JP2013-18846A.

Further, as another organic solvent, an alkylene oxide (AO) adduct of glycerin can be used. As the alkylene oxide adduct of glycerin, a compound represented by Structural Formula (I) below is preferable from the viewpoint of the permeability of the ink to a recording medium.

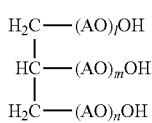

Structural Formula (I)

In Structural Formula (I), l, m, and n each independently represent an integer of 1 or greater and satisfy 1+m+n=3 to 15. When the value of 1+m+n is 3 or greater, a satisfactory curl suppression effect is obtained and when the value is 15 or less, satisfactory jettability can be maintained. Among these, the value of 1+m+n is preferably within a range of 3 to 12 and more preferably within a range of 3 to 10. AO in Structural Formula (I) represents ethyleneoxy (which may be abbreviated by EO) and/or propyleneoxy (which may be abbreviated by PO), and out of these, the propyleneoxy group is preferable. Each AO of $(AO)_l$, $(AO)_m$, and $(AO)_n$ may be the same or different from each other.

Hereinafter, examples of the compound represented by Structural Formula (I) will be shown. However, the present invention is not limited thereto.

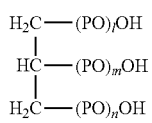

(SP value = 26.4)

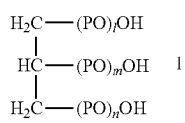

(SP value = 24.9)

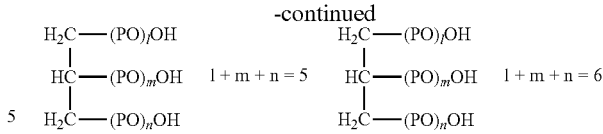

(SP value = 23.9)  (SP value = 23.2)

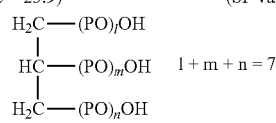

(SP value = 22.6)

$nC_4H_9O(AO)_4$—H
(AO=EO or PO (EO:PO=1:1), SP value=20.1)
$nC_4H_9O(AO)_{10}$—H
(AO=EO or PO (EO:PO=1:1), SP value=18.8)
$HO(A'O)_{40}$—H
(A'O=EO or PO (EO:PO=1:3), SP value=18.7)
$HO(A''O)_{55}$—H
(A''O=EO or PO (EO:PO=5:6), SP value=18.8)
$HO(PO)_3$—H (SP value=24.7)
$HO(PO)_7$—H (SP value=21.2)
1,2-hexanediol (SP value=27.4)

In the above compounds, EO represents an ethyleneoxy group and PO represents a propyleneoxy group.

As the alkylene oxide adduct of glycerin, a commercially available product on the market may be used. For example, as polyoxypropylated glycerin (ether of polypropylene glycol and glycerin), SUNNIX GP-250 (average molecular weight of 250), SUNNIX GP-400 (average molecular weight of 400), and SUNNIX GP-600 (average molecular weight of 600) (all manufactured by Sanyo Chemical Industries, Ltd.); LEOCON GP-250 (average molecular weight of 250), LEOCON GP-300 (the average molecular weight of 300), LEOCON GP-400 (average molecular weight of 400), and LEOCON GP-700 (average molecular weight of 700) (all manufactured by Lion Corporation); and polypropylene glycol-triol type (average molecular weights of 300 and 700) (all manufactured by Wako Pure Chemical Industries, Ltd.) are exemplified.

In addition, as another organic solvent, a pyrrolidone derivative can be used.

As the pyrrolidone derivative, compounds described in paragraphs "0047" to "0059" of JP2013-18282A are suitable.

Examples of the pyrrolidone derivative include 2-pyrrolidone, N-methyl-2-pyrrolidone, N-ethyl-2-pyrrolidone, N-butyl-2-pyrrolidone, N-vinyl-2-pyrrolidone, 5-methyl-2-pyrrolidone, N-phenyl-2-pyrrolidone, N-cycohexyl-2-pyrrolidone, and N-hydroxyethyl-2-pyrrolidone. Among these, from the viewpoint of improving the rub resistance of an image, 2-pyrrolidone, N-methyl-2-pyrrolidone, and N-ethyl-2-pyrrolidone are preferable, 2-pyrrolidone and N-methyl-2-pyrrolidone are more preferable, and 2-pyrrolidone is particularly preferable.

From the viewpoint of imparting the viscosity suitable for an ink jet head with no effect on jettability, as another organic solvent, glycols such as glycerin, ethylene glycol, propylene glycol, diethylene glycol, triethylene glycol, tetraethylene glycol, dipropylene glycol, and tripropylene glycol; polyhydric alcohols such as alkane diols including 2-butene-1,4-diol, 2-ethyl-1,3-hexane diol, 2-methyl-2,4-pentanediol, 1,2-octanediol, 1,2-hexanediol, 1,2-pentanediol, and 4-methyl-1,2-pentanediol; and pyrrolidone derivatives are preferable, and glycerin, diethylene glycol and pyrrolidone derivatives are particularly preferable.

The total content of the organic solvent in the ink jet recording ink of the present invention is preferably 25% by mass or more and 70% by mass or less, more preferably 30% by mass or more and 65% by mass or less, and still more preferably 35% by mass or more and 60% by mass or less with respect to the total mass of the ink.

The total content of the organic solvent used herein refers to the total amount of the total content of the specific organic solvent and the total content of another organic solvent.

The specific organic solvent of the present invention is preferably 1% by mass to 40% by mass, more preferably 1.2% by mass to 25% by mass, and particularly preferably 1.4% by mass to 20% by mass with respect to the total mass of the organic solvents in the ink.

Particularly, the content of glycerin as another organic solvent in the present invention is preferably 5% by mass or more and 95% by mass or less and more preferably 10% by mass or more and 90% by mass or less with respect to the total content of the organic solvents in the ink. Particularly, the content of 2-pyrrolidone as another organic solvent in the present invention is preferably 1% by mass or more and 40% by mass or less and more preferably 3% by mass or more and 30% by mass or less with respect to the total amount of the organic solvents in the ink.

<<Surfactant>>

The content of the surfactant in the ink of the present invention is less than 0.1% by mass with respect to the total mass of the ink.

When the content of the surfactant is 0.1% by mass or more, strike-through of the ink cannot be suppressed.

From the viewpoint of suppression of strike-through, the content of the surfactant is preferably 0.05% by mass or less with respect to the total mass of the ink and more preferably not included in the ink.

The surfactant in the present invention include an specific nonionic surfactant, a cationic surfactant, an anionic surfactant, and an amphoteric surfactant.

As the specific nonionic surfactant, an acetylene-based polyoxyethylene oxide surfactant may be used. Specific examples thereof include SURFYNOLs (manufactured by Air Products and Chemicals, Inc.), OLFINE E1006, OLFINE E1008, OLFINE E1010, and OLFINE E1020 (manufactured by Nissin Chemical Industry Co., Ltd.).

Examples of surfactants other than the specific nonionic surfactant include anionic surfactants such as fatty acid salts, alkylsulfuric acid ester salts, alkylbenzenesulfonic acid salts, alkylnaphthalenesulfonic acid salts, dialkylsulfosuccinic acid salts, alkylphosphoric acid ester salts, naphthalenesulfonic acid-formalin condensate, and polyoxyethylene alkylsulfuric acid ester salts; and amine oxide type amphoteric surfactants such as N,N-dimethyl-N-alkylamine oxide.

<<Water>>

The ink of the present invention contains water. Although the content of water is not particularly limited, the content of water is preferably within a range of 10% by mass to 99% by mass, more preferably within a range of 30% by mass to 80% by mass, and still more preferably within a range of 40% by mass to 70% by mass with respect to the total mass of the ink.

<<Other Additives>>

The ink of the present invention can include other additives within a range not impairing the effect of the present invention, as required. Examples of other additives include known additives such as an anti-drying agent (wetting agent), a penetration enhancer, an ultraviolet absorbent, an antifading agent, a fungicide, a pH adjusting agent, a bronze improver, a pH buffer agent, an emulsion stabilizer, a preservative, a surface tension adjuster, a defoamer, a viscosity-adjusting agent, a dispersing agent, a dispersion stabilizer, a rust inhibitor, and a chelating agent. In the case of a water-soluble ink, these various additives can be added directly to the ink solution.

(Anti-Drying Agent)

The anti-drying agent is suitably used for preventing clogging due to the dried ink jet recording ink at ink ejection ports of nozzles used in an ink jet recording system.

As the anti-drying agent, a water soluble organic solvent having a vapor pressure lower than that of water is preferable. Specific examples thereof include polyhydric alcohols such as ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin and trimethylol propane; lower alkyl ethers of polyhydric alcohols, such as ethylene glycol monomethyl (or monoethyl) ether, diethylene glycol monomethyl (or monoethyl) ether, and triethylene glycol monoethyl (or monobutyl) ether; heterocyclic compounds such as 2-pyrrolidone, N-methyl-2-pyrrolidone, 1,3-dimethyl-2-imidazolidinone and N-ethyl morpholine; sulfur-containing compounds such as sulfolane, dimethyl sulfoxide and 3-sulfolene; polyfunctional compounds such as diacetone alcohol and diethanol amime; and urea derivatives.

Among these, polyhydric alcohols such as glycerin and diethylene glycol are preferable as anti-drying agents. In addition, the anti-drying agents may be used alone or in combination of two or more.

(Penetration Enhancer)

The penetration enhancer is suitably used for promoting the penetration of the ink jet recording ink into paper. As the penetration enhancer, alcohols such as ethanol, isopropanol, butanol, diethylene glycol monobutyl ether, triethylene glycol monobutyl ether and 1,2-hexanediol, sodium lauryl sulfate, and sodium oleate can be used.

These penetration enhancers can be used in the ink at an amount in a range in which image blurring or strike-through (print-through) is not caused.

(Ultraviolet Absorbent)

The ultraviolet absorbent is used for improving the light fastness of an image. Examples of the ultraviolet absorbent include benzotriazole-based compounds described in JP1983-185677A (JP-558-185677A), JP1986-190537A (JP-561-190537A), JP1990-782A (JP-H02-782A), JP1993-197075A (JP-H05-197075A), JP1997-34057A (JP-H09-34057A), and the like; benzophenone-based compounds described in JP1971-2784A (JP-546-2784A), JP1993-194483A (JP-H05-194483A), U.S. Pat. No. 3,214,463A, and the like; cinnamic acid-based compounds described in JP1973-30492B (JP-548-30492B), JP1981-21141B (JP-556-21141B), and JP1998-88106A (JP-H10-88106A), and the like; triazine-based compounds described in JP1992-298503A (JP-H04-298503A), JP1996-53427A (JP-H08-53427A), JP1996-239368A (JP-H08-239368A), JP1998-182621A (JP-H10-182621A), JP1996-501291A (JP-H08-501291A), and the like; and compounds, so-called fluorescent brightening agents, which absorb ultraviolet rays and emit fluorescence, represented by compounds described in Research Disclosure No. 24239, stilbene-based compounds and benzoxazole-based compounds.

(Antifading Agent)

The antifading agent is used for improving the light fastness of an image. As the antifading agent, various organic and metal complex-based antifading agents can be used. Examples of the organic antifading agent include hydroquinones, alkoxyphenols, dialkoxyphenols, phenols, anilines, amines, indanes, chromanes, alkoxyanilines and heterocyclic compounds. Examples of the metal complex-based antifading agent include nickel complexes and zinc complexes. More specifically, it is possible to use compounds described in the patents cited in paragraphs I to J of No. VII of Research Disclosure No. 17643, Research Disclosure No. 15162, the left column of page 650 of Research Disclosure No. 18716, page 527 of Research Disclosure No. 36544, page 872 of Research Disclosure No. 307105, and Research Disclosure No. 15162, and compounds included in the general formulas and compound examples of representative compounds described in pages 127 to 137 of JP1987-215272A (JP-S62-215272A).

(Fungicide)

Examples of the fungicide include sodium dehydroacetate, sodium benzoate, sodium pyridinethione-1-oxide, ethyl ester of p-hydroxybenzoic acid, 1,2-benzisothiazolin-3-one, and salts thereof. The content of the fungicide in the ink is preferably 0.02% by mass to 1.00% by mass.

(pH Adjusting Agent)

As the pH adjusting agent, a neutralizing agent (organic base, inorganic alkali) can be used. The pH adjusting agent is used for improving the storage stability of the ink jet recording ink and preferably added to the ink so that the pH of the ink jet recording ink becomes 6 to 10 and more preferably added to the ink so that the pH thereof becomes 7 to 10.

(Chelating Agent)

Examples of the chelating agent include ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), diethylenetriamine-N,N,N',N',N'-pentaacetic acid (DTPA), and glycoletherdiamine-N,N,N',N'-tetraacetic acid (GEDTA).

(Bronze Improver)

The ink of the present invention may contain a colorless water-soluble planar compound having 10 or more delocalized π electrons in one molecule as the bronze improver. Specific examples of the bronze improver include compounds described in paragraphs "0017" to "0025" of JP2005-105261A and compounds described in paragraph "0032" of JP2006-249275A.

The amount of the bronze improver to be added to the ink may be within a range in which the effect of the present invention is exhibited and is preferably 0.001% by mass to 50% by mass, and more preferably 0.01% by mass to 20% by mass in the ink composition.

(pH Buffering Agent)

The ink of the present invention may contain a pH buffering agent for preventing bleeding between colors.

In the ink of the present invention, the pH of the ink is preferably maintained at 7.0 to 9.5 using the pH buffering agent. When the pH of the ink is 7.0 or more, bleeding between colors and color irregularity are prevented from occurring and thus image fixability is improved. When the pH is 9.5 or less, members of a head can be prevented from being damaged.

Examples of the pH buffering agent include potassium dihydrogenphosphate/sodium hydroxide, sodium tetraborate/hydrochloric acid, potassium dihydrogenphosphate/disodium hydrogenphosphate, ammonium chloride/ammonia, trisaminomethane/hydrochloric acid, and combinations of ACES, ADA, BES, Bicine, Bis-Tris, CHES, DISPO, EPPS, HEPES, HEPPSO, MES, MOPS, MOPSO, POPSO, TAPS, TAPSO, TES, and Tricine, which are good buffers, and sodium hydroxide, potassium hydroxide, and ammonia. Among the above, a pH buffering agent containing sodium hydroxide, potassium hydroxide, and ammonia as alkali is particularly preferable. Effects of these pH buffering agents are remarkably exhibited in the case in which the amount of ink drops is 1 pl to 20 pl (picoliter), and preferably 2 pl to 18 pl. The effects are satisfactorily exhibited in a thermal ink jet system.

The surface tension of the ink of the present invention is preferably 25 mN/m to 70 mN/m and more preferably 27 mN/m to 50 mN/m at 25° C. When the surface tension of the ink is within the above range, the jetting stability of the ink is improved and strike-through of the ink is further suppressed.

Here, the surface tension of the ink refers to a value measured by using an Automatic Surface Tensiometer CBVP-Z (manufactured by Kyowa Interface Science Co. Ltd.) under the condition of a liquid temperature of 25° C.

The viscosity of the ink of the present invention is preferably 30 mPa·s or less and more preferably 1.5 mPa·s to 20 mPa·s at 25° C. When the viscosity of the ink is within the above range, the jetting stability of the ink is improved and thus strike-through of the ink is further suppressed.

Here, the viscosity of the ink refers to a value measured by using a VISCOMETER TV-22 (manufactured by TOKISANGYO CO. LTD) under the condition of a liquid temperature of 25° C.

<<Ink Jet Image Forming Method>>

An ink jet image can be formed by using the above-described ink jet recording ink of the present invention. The image may be formed by causing the first ink drop (dot) to land on the surface of a recording medium and then jetting the second dot as an ink having a color tone different from the hue of the first dot at a position in contact with the first dot within a range of 50 ms from the position of the first dot. Accordingly, an image can be formed at a high speed.

The ink jet image can be formed on a known recording medium, for example, plain paper, resin coated paper, by supplying energy to the ink jet recording ink. Specifically, the image can be formed on ink jet specific papers disclosed in P1996-169172A (JP-H08-169172A), JP1996-27693A (JP-H08-27693A), JP1990-276670A (JP-H02-276670A), JP1995-276789A (JP-H07-276789A), JP1997-323475A (JP-H09-323475A), JP1987-238783A (JP-S62-238783A), JP1998-153989A (JP-H10-153989A), JP1998-217473A (JP-H10-217473A), JP1998-235995A (JP-H10-235995A), JP1998-337947A (JP-H10-337947A), JP1998-217597A (JP-H10-217597A), JP1998-337947A (JP-H10-337947A), and the like. Among these recording mediums, in order to further exhibit the effect of the present invention, recording mediums, which will be described later, are preferable.

As a base paper in the recording medium, a chemical pulp, such as LBKP or NBKP; a mechanical pulp, such as GP, PGW, RMP, TMP, CTMP, CMP, or CGP; or a waste paper pulp such as DIP; to which known additives, such as pigments, binders, sizing agents, fixing agents, cationic agents, and paper strength additives, are mixed, as required, and produced by various devices such as a Fourdrinier paper machine and a cylinder paper machine can be used. Besides these base papers, synthetic paper may be used as the base paper and this base paper preferably has a thickness of 10 μm to 250 μm and a basis weight of 10 g/m$^2$ to 250 g/m$^2$. With the ink of the present invention, strike-through of the ink can be suppressed even on a plain paper having a basis weight of 110 g/m² or less and thus can be preferably used even when an ink jet image is formed on a plain paper a basis weight of 90 g/m² or less.

When an image is formed, for the purpose of imparting glossiness and water resistance, and for the purpose of improving weather fastness, a polymer latex compound may be used. The polymer latex compound may be applied to a recording medium before, after, or while the dye is applied to the recording medium. In addition, the polymer latex compound may be added in the recording paper or in the ink. Alternatively, a dispersion liquid including only the polymer latex compound may be used to be applied to the recording medium. Specifically, methods disclosed in JP2002-166638A, JP2002-121440A, JP2002-154201A, JP2002-144696A, and JP2002-080759A can be preferably used.

A recording method for forming an image by an ink jet method is not particularly limited and known methods, for example, a charge control method in which an ink is jetted by utilizing an electrostatic attraction force, a drop-on-demand method (pressure-pulse method) in which a pressure of oscillation of a piezo element is utilized, an acoustic ink jet method in which an ink is jetted by utilizing radiation pressure generated by irradiation of ink with acoustic beams that have been converted from electrical signals, and a thermal ink jet method in which an ink is jetted by utilizing a pressure generated by bubbles formed by heating of the ink may be used. The scope of the ink jet recording method includes a method in which a large number of small volume droplets of an ink having a low density, which is called a photo ink, are jetted, a method in which plural inks with substantially the same tone but different densities are used to improve image quality, and a method in which a colorless and transparent ink is used.

EXAMPLES

Hereinafter, the present invention will be described in detail with reference to examples. The present invention is not limited to these Examples.

Example 1

<Preparation of Ink 1>

The components were mixed at the following composition and then were stirred at room temperature (25° C.) for 1 hour to obtain a solution. The obtained solution was allowed to pass through a membrane filter having a pore diameter of 0.22 μm and coarse particles were removed. Thus, Ink 1 was prepared.

Composition of Ink 1

Acid Red 249 (dye: weight average molecular weight (Mw)=750) . . . 3.0% by mass
Specific organic solvent 2 (SP value=9.69) . . . 1.0% by mass
Glycerin . . . 41.0% by mass
Diethylene glycol . . . 5.0% by mass
2-Pyrrolidone . . . 5.0% by mass
Ion exchange water . . . residual amount assuming that the entire is 100% by mass The prepared Ink 1 has a viscosity of 6.5 mPa·s (25° C.) and a surface tension of 39 mN/m (25° C.).

The viscosity and the surface tension were respectively measured by using a VISCOMETER TV-22 (manufactured by TOKISANGYO CO. LTD) and an Automatic Surface Tensiometer CBVP-Z (manufactured by Kyowa Interface Science Co. Ltd.).

Examples 2 to 21 and Comparative Examples 1 to 6

Examples 2 to 21 and Comparative Examples 1 to 6 were prepared in the same manner as in Example 1 except that the amounts of the dye, the specific organic solvent, and another organic solvent to be formulated in Ink 1 in Example 1 were changed to the formulation amounts shown in Tables 2 to 4. In addition, the viscosity and surface tension of each ink prepared were measured by the above-described manner. The measurement results are shown in Tables 2 to 4.

Comparative Example 7

An ink in Comparative Example 7 was prepared in the same manner as in Example 1 except that a surfactant was further added to Ink 1 in Example 1 to have a formulation shown in Table 4 below. In addition, the viscosity and surface tension of the prepared ink were measured by the above-described manner. The measurement results are shown in Table 4.

The numerical values of each component shown in Tables 2 to 4 indicate percent by mass of each component in the case in which the total mass of the ink is 100% by mass.

TABLE 2

|  | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| Type of dye | AR249 (Mw 750) | AV5 (Mw 680) | AR106 (Mw 623) | DB19 (Mw 841) | AB241 (Mw 752) | AR138 (Mw 679) | AV7 (Mw 568) | AR249 (Mw 750) | AR249 (Mw 750) | AR249 (Mw 750) | AR249 (Mw 750) |
| Dye | 3 | 3 | 3 | 3 | 3 | 3 | 3 | 3 | 3 | 3 | 3 |
| Specific organic solvent 1 (SP value = 9.70) | — | — | — | — | — | — | — | 1 | — | — | — |
| Specific organic solvent 2 (SP value = 9.69) | 1 | 1 | 1 | 1 | 1 | 1 | 1 | — | — | — | — |
| Specific organic solvent 3 (SP value = 9.60) | — | — | — | — | — | — | — | — | 1 | — | — |

TABLE 2-continued

|  | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| Specific organic solvent 4 (SP value = 9.45) | — | — | — | — | — | — | — | — | — | 1 | — |
| Specific organic solvent 5 (SP value = 9.67) | — | — | — | — | — | — | — | — | — | — | 1 |
| Comparative organic solvent 1 (SP value = 9.79) | — | — | — | — | — | — | — | — | — | — | — |
| Comparative organic solvent 2 (SP value = 9.47) | — | — | — | — | — | — | — | — | — | — | — |
| Comparative organic solvent 3 (SP value = 9.87) | — | — | — | — | — | — | — | — | — | — | — |
| Comparative organic solvent 4 (SP value = 9.37) | — | — | — | — | — | — | — | — | — | — | — |
| Glycerin | 41 | 41 | 41 | 41 | 41 | 41 | 41 | 41 | 41 | 41 | 41 |
| Diethylene glycol | 5 | 5 | 5 | 5 | 5 | 5 | 5 | 5 | 5 | 5 | 5 |
| 2-Pyrrolidone | 5 | 5 | 5 | 5 | 5 | 5 | 5 | 5 | 5 | 5 | 5 |
| Safinol 465 (surfactant) | — | — | — | — | — | — | — | — | — | — | — |
| Ion exchange water | Residual amount | Residual amount | Residual amount | Residual amount | Residual amount | Residual amount | Residual amount | Residual amount | Residual amount | Residual amount | Residual amount |
| Viscosity (mPa · s) | 6.5 | 6.5 | 6.5 | 6.5 | 6.5 | 6.5 | 6.5 | 6.5 | 6.5 | 6.5 | 6.5 |
| Surface tension (mN/m) | 39 | 39 | 39 | 40 | 39 | 39 | 39 | 43 | 37 | 35 | 38 |

TABLE 3

|  | Example 12 | Example 13 | Example 14 | Example 15 | Example 16 | Example 17 | Example 18 | Example 19 | Example 20 | Example 21 |
|---|---|---|---|---|---|---|---|---|---|---|
| Type of dye | AR249 (Mw 750) | AR249 (Mw 750) | AR249 (Mw 750) | AR249 (Mw 750) | AR249 (Mw 750) | AR249 (Mw 750) | AR249 (Mw 750) | AR249 (Mw 750) | AR249 (Mw 750) | AR249 (Mw 750) |
| Dye | 3 | 3 | 3 | 3 | 3 | 3 | 3 | 3 | 3 | 3 |
| Specific organic solvent 1 (SP value = 9.70) | — | — | — | — | — | — | — | — | — | — |
| Specific organic solvent 2 (SP value = 9.69) | 0.1 | 0.5 | 2 | 3 | 4.5 | 15 | 1 | 1 | 1 | 1 |
| Specific organic solvent 3 (SP value = 9.60) | — | — | — | — | — | — | — | — | — | — |
| Specific organic solvent 4 (SP value = 9.45) | — | — | — | — | — | — | — | — | — | — |
| Specific organic solvent 5 (SP value = 9.67) | — | — | — | — | — | — | — | — | — | — |
| Comparative organic solvent 1 (SP value = 9.79) | — | — | — | — | — | — | — | — | — | — |

TABLE 3-continued

|  | Example 12 | Example 13 | Example 14 | Example 15 | Example 16 | Example 17 | Example 18 | Example 19 | Example 20 | Example 21 |
|---|---|---|---|---|---|---|---|---|---|---|
| Comparative organic solvent 2 (SP value = 9.47) | — | — | — | — | — | — | — | — | — | — |
| Comparative organic solvent 3 (SP value = 9.87) | — | — | — | — | — | — | — | — | — | — |
| Comparative organic solvent 4 (SP value = 9.37) | — | — | — | — | — | — | — | — | — | — |
| Glycerin | 41 | 41 | 41 | 41 | 41 | 35 | 30 | 35 | 48 | 56 |
| Diethylene glycol | 5 | 5 | 5 | 5 | 5 | 5 | 5 | 5 | 5 | 5 |
| 2-Pyrrolidone | 5 | 5 | 5 | 5 | 5 | 5 | 5 | 5 | 5 | 5 |
| Safinol 465 (surfactant) | — | — | — | — | — | — | — | — | — | — |
| Ion exchange water | Residual amount | Residual amount | Residual amount | Residual amount | Residual amount | Residual amount | Residual amount | Residual amount | Residual amount | Residual amount |
| Viscosity (mPa·s) | 6 | 6.5 | 6.5 | 7 | 7.5 | 8 | 5 | 5.5 | 7 | 8 |
| Surface tension (mN/m) | 50 | 45 | 33 | 30 | 28 | 27 | 40 | 39 | 39 | 38 |

TABLE 4

|  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Type of dye | RR261 (Mw 885) | AR249 (Mw 750) | AR249 (Mw 750) | AR249 (Mw 750) | AR249 (Mw 750) | AR249 (Mw 750) | AR249 (Mw 750) |
| Dye | 3 | 3 | 3 | 3 | 3 | 3 | 3 |
| Specific organic solvent 1 (SP value = 9.70) | — | — | — | — | — | — | — |
| Specific organic solvent 2 (SP value = 9.69) | 1 | — | — | — | — | — | 1 |
| Specific organic solvent 3 (SP value = 9.60) | — | — | — | 1 | — | — | — |
| Specific organic solvent 4 (SP value = 9.45) | — | — | — | — | — | — | — |
| Specific organic solvent 5 (SP value = 9.67) | — | — | — | — | — | — | — |
| Comparative organic solvent 1 (SP value = 9.79) | — | 1 | — | — | — | — | — |
| Comparative organic solvent 2 (SP value = 9.47) | — | — | 1 | — | — | — | — |
| Comparative organic solvent 3 (SP value = 9.87) | — | — | — | 1 | — | — | — |
| Comparative organic solvent 4 (SP value = 9.37) | — | — | — | — | 1 | — | — |
| Glycerin | 41 | 41 | 41 | 41 | 41 | 41 | 41 |
| Diethylene glycol | 5 | 5 | 5 | 5 | 5 | 5 | 5 |
| 2-Pyrrolidone | 5 | 5 | 5 | 5 | 5 | 5 | 5 |
| Safinol 465 (surfactant) | — | — | — | — | — | — | 1 |
| Ion exchange water | Residual amount | Residual amount | Residual amount | Residual amount | Residual amount | Residual amount | Residual amount |
| Viscosity (mPa·s) | 6.5 | 6 | 7 | 6.5 | 7 | 6 | 6.5 |
| Surface tension (mN/m) | 39 | 48 | 35 | 40 | 34 | 51 | 38 |

Each component in Tables 2 to 4 will be described.
(Dye)
AR249: C.I. Acid Red 249
AV5: C.I. Acid Violet 5
AR106: C.I. Acid Red 106
DB19: C.I. Direct Black 19
AB241: C.I. Acid Black 19
AR138: C.I. Acid Red 138
AV7: C.I. Acid Violet 7
RR261: C.I. Reactive Red 261
The configuration of each dye will be shown below.
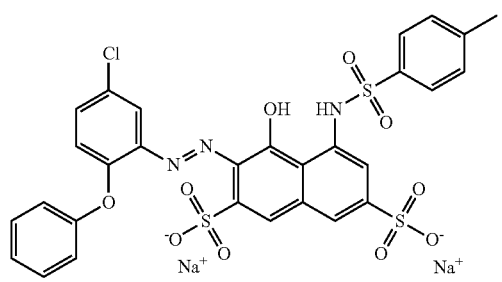
AR249
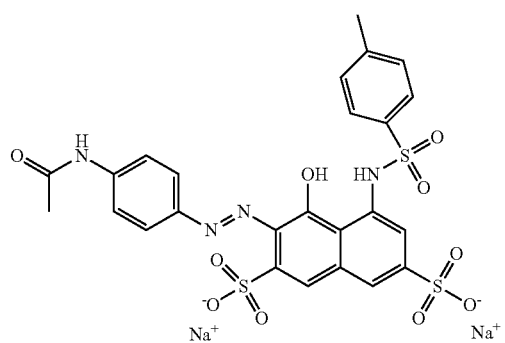
AV5
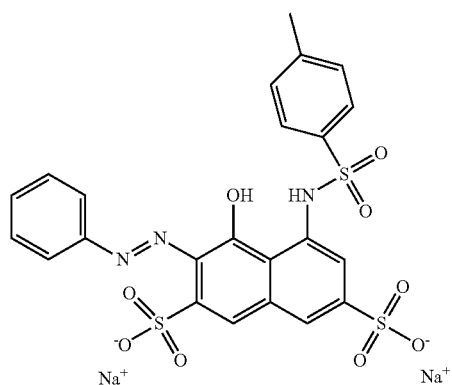
AR106
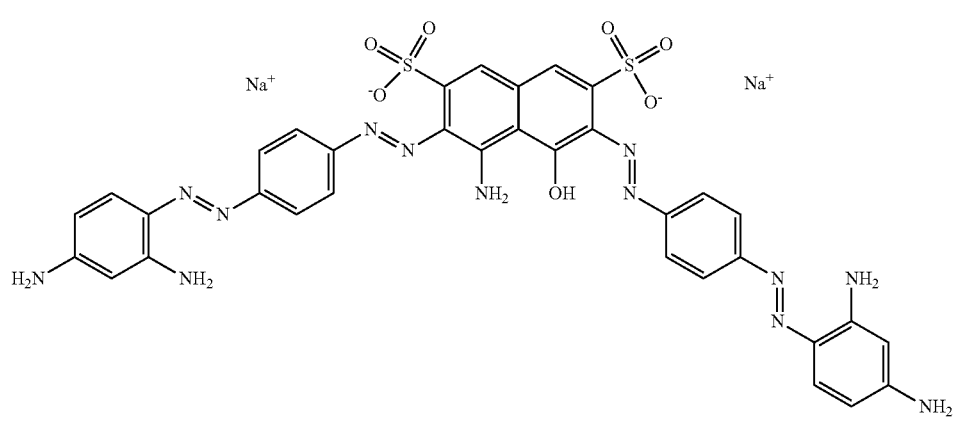
DB19
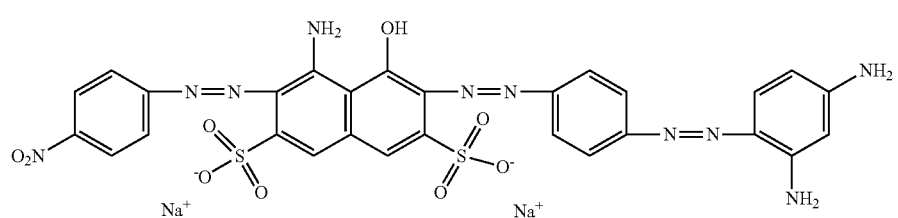
AB241

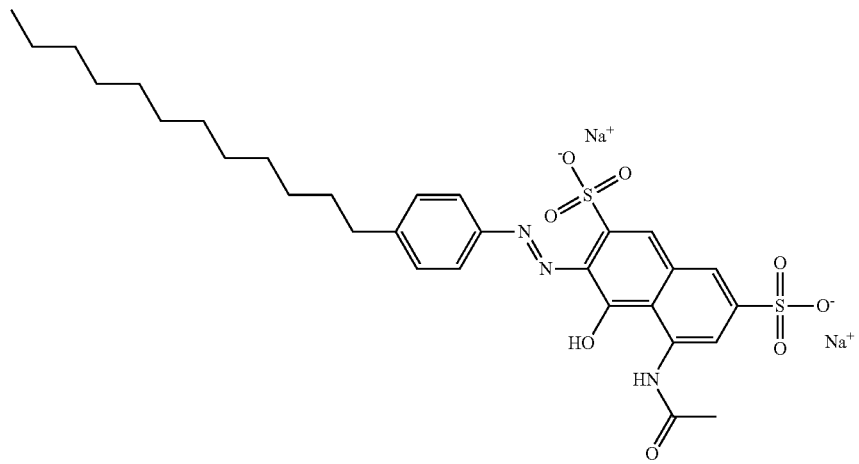

AR138

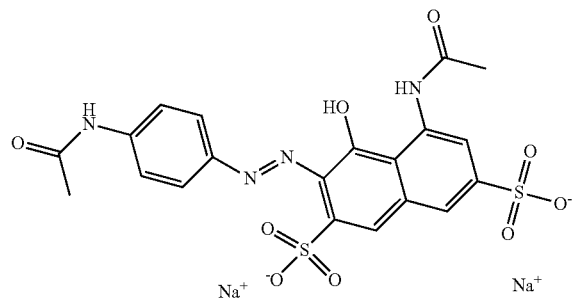

AV7

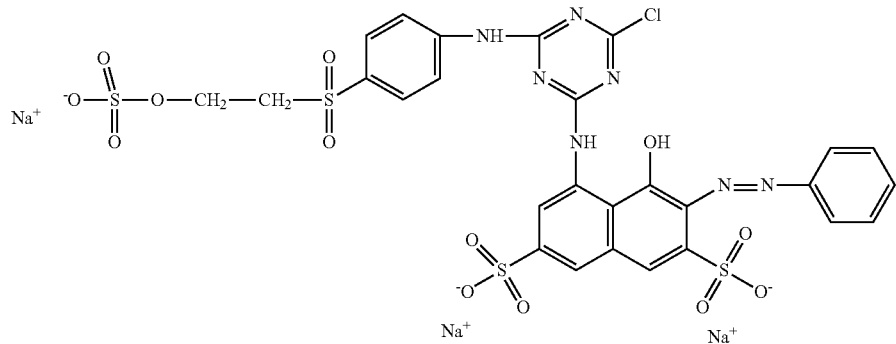

RR261

(Specific Organic Solvent)
Specific organic solvent 1: $C_2H_5O—(C_3H_6O)_3—H$
Specific organic solvent 2: $C_4H_9O—(C_3H_6O)_2—H$
Specific organic solvent 3: $C_6H_{13}O—(C_3H_6O)_1—H$
Specific organic solvent 4: $C_6H_{13}O—(C_3H_6O)_3—H$
Specific organic solvent 5: $C_6H_{13}O—(C_2H_4O)_2—H$
Comparative organic solvent 1: $CH_3O—(C_3H_6O)_1—H$
Comparative organic solvent 2: $C_8H_{17}O—(C_3H_6O)_1—H$
Comparative organic solvent 3: $C_4H_9O—(C_2H_4O)_2—H$, which is also known as DEGmBE.
Comparative organic solvent 4: $C_8H_{17}O—(C_3H_6O)_3—H$ —Evaluation—

The jetting stability of the inks and the strike-through of the inks of Examples 1 to 21 and Comparative Examples 1 to 7 were evaluated by the following manner.

<Jetting Stability>

An ink jet head having a silicon nozzle plate on which plural nozzles arranged in a two-dimensional matrix form were provided was prepared and storage tanks connected to the silicon nozzle plate were refilled with inks of each Example and Comparative Example, respectively.

The ink jet head was fixed such that the movement direction of the stage was perpendicular to the arrangement direction of the nozzles. An ink jet specific paper NEXT IJ 55 (basis weight 64 $g/m^2$ –1 $g/m^2$, +8 $g/m^2$: standard value) as a recording medium was attached to the stage that moves in a direction perpendicular to the arrangement direction of the nozzles of the head.

Next, the stage was moved at 248 mm/min, and a print sample of a solid image under the conditions of an amount of ink drops of 3.4 pl, a jetting frequency of 10 kHz, and a nozzle arrangement direction×transport direction: 1,200 dpi (dots per inch)×1,200 dpi was prepared. The obtained print sample was visually observed, and it was confirmed that the ink was jetted from all of the nozzles.

After jetting the ink, the head was left to stand still for 3 hours under the environment of 25° C. and 80% RH and then a new recording medium was attached to thereto. A print sample was formed by jetting the ink under the same conditions. The obtained print sample was visually observed, and the number of nozzles which did not perform jetting after the nozzles performed jetting 2,000 times was evaluated.

The jetting stability was evaluated by the number of nozzles which did not perform jetting (unit: lines) and the evaluation results are shown in Table 5 below. When the number of nozzles which do not perform jetting is 5 or less, the number is within an allowable range for practical applications.

<Strike-Through Properties>

Using the same ink jet head used in the evaluation of the jetting stability, a solid image was formed on an ink jet specific paper NEXT IJ 55 (basis weight 64 g/m², −1 g/m², +8 g/m²: standard value) under the conditions of an amount of ink drops of 3.4 pl, a jetting frequency of 10 kHz, and a nozzle arrangement direction×transport direction: 1,200 dpi (dots per inch)×1,200 dpi and thus a print sample was prepared.

The optical reflection density of the printed surface of the print sample was measured by a reflective type color spectrodensitometer (X-RITE 530, Status T, manufactured by X-Rite Inc.) (the value of the optical reflection density of the printed surface was set to $D_0$).

Then, the print sample was held under the conditions of 40° C. and 90% RH for 20 hours, and the optical reflection density of the rear surface of the print sample was measured in the same manner (the value of the optical reflection density of the rear surface of the print sample was set to $D_1$).

The value of $D_1/D_0$ indicates the strike-through properties. When the value was 0.2 or less, there was no problem in practical applications and when the value was 0.1 or less, the strike-through properties were satisfactory.

TABLE 5

| | Jetting stability | Strike-though properties |
|---|---|---|
| Example 1 | 0 | 0.09 |
| Example 2 | 0 | 0.11 |
| Example 3 | 0 | 0.12 |
| Example 4 | 3 | 0.13 |
| Example 5 | 3 | 0.16 |
| Example 6 | 1 | 0.18 |
| Example 7 | 0 | 0.20 |
| Example 8 | 0 | 0.12 |
| Example 9 | 0 | 0.15 |
| Example 10 | 0 | 0.20 |
| Example 11 | 0 | 0.10 |
| Example 12 | 0 | 0.20 |
| Example 13 | 0 | 0.12 |
| Example 14 | 0 | 0.15 |
| Example 15 | 0 | 0.15 |
| Example 16 | 2 | 0.15 |
| Example 17 | 5 | 0.15 |
| Example 18 | 5 | 0.09 |
| Example 19 | 0 | 0.09 |
| Example 20 | 0 | 0.14 |
| Example 21 | 0 | 0.20 |
| Comparative Example 1 | 10 | 0.11 |
| Comparative Example 2 | 1 | 0.26 |
| Comparative Example 3 | 1 | 0.21 |
| Comparative Example 4 | 5 | 0.28 |
| Comparative Example 5 | 10 | 0.20 |
| Comparative Example 6 | 0 | 0.31 |
| Comparative Example 7 | 0 | 0.30 |

As shown in Table 5, it was found that both the jetting stability and the strike-through properties were satisfactory in each Example.

The disclosure of JP2014-017911 is incorporated in the specification by reference in its entirety.

All cited documents, patent applications and technical standards mentioned in the specification are incorporated by reference in the specification to the same extent as if the individual cited documents, patent applications and technical standards were specifically and individually indicated to be incorporated by reference.

What is claimed is:

1. An ink jet recording ink comprising:
   a dye which has a weight average molecular weight of 850 or less and is represented by Formula (1) below;
   a water-soluble organic solvent which has an SP value of 9.6 or more and less than 9.7 and is represented by Formula (2) below; and
   water,
   wherein a content of a surfactant is less than 0.1% by mass,

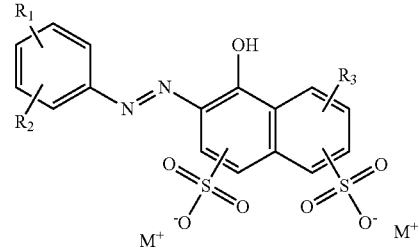

Formula (1)

wherein in Formula (1), $R_1$ represents a hydrogen atom, methyl group, a nitro group, an anilino group, an acetamide group, —O—$C_6H_5$, or —O—$CH_2$—$C_6H_5$,
$R_2$ represents a hydrogen atom or a halogen atom,
$R_3$ represents a monovalent group selected from the group consisting of a hydrogen atom, an amino group, an acetamide group, an azophenyl group, an azonaphthalene group, and -$L_2$-Rb,
$L_2$ represents a bivalent linking group consisting of one or a combination of two to five selected from the group consisting of —C(=O)—, —$C_6H_4$—, —N=N—, —NH—, and —$SO_2$—,
Rb represents a phenyl group, a naphthyl group, a pyrimidyl group, a triazinyl group, or a quinoxaline group, and
$M^+$ represents a hydrogen ion, a sodium ion, a potassium ion, a lithium ion, an ammonium ion, or an alkylammonium ion, and

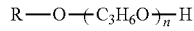

Formula (2)

R—O—$(C_3H_6O)_n$—H in Formula (2), R represents an unsubstituted alkyl group having 2 to 6 carbon atoms, and n represents an integer of 1 to 3.

2. The ink jet recording ink according to claim 1, wherein a content of the water-soluble organic solvent represented by Formula (2) above is 0.1% by mass to 4.5% by mass with respect to the total mass of the ink.

3. The ink jet recording ink according to claim 1, wherein the dye represented by Formula (1) above is a monoazo dye.

4. The ink jet recording ink according to claim 1, wherein the dye represented by Formula (1) above has a weight average molecular weight of 650 to 850.

5. The ink jet recording ink according to claim 1, wherein in Formula (1) above, $R_3$ represents —NH—$SO_2$—$C_6H_5$ or —NH—$SO_2$—$C_6H_4$—$CH_3$.

6. The ink jet recording ink according to claim 1, wherein in Formula (1) above, $M^+$ is a sodium ion.

7. The ink jet recording ink according to claim 1, wherein the dye represented by Formula (1) above has a weight average molecular weight of 650 to 850, and in Formula (1) above, $R_3$ represents —NH—$SO_2$—$C_6H_5$ or —NH—$SO_2$—$C_6H_4$—$CH_3$.

8. The ink jet recording ink according to claim 7, wherein a content of the water-soluble organic solvent represented by Formula (2) above is 0.1% by mass to 4.5% by mass with respect to the total mass of the ink.

9. The ink jet recording ink according to claim 1, wherein the dye represented by Formula (1) above is a compound represented by Formula (1a) below, Formula (1a)

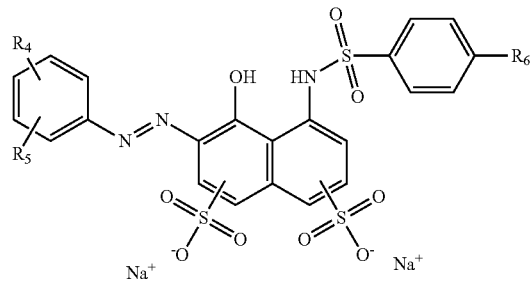

wherein in Formula (1a), $R_4$ and $R_5$ each independently represent a monovalent group selected from the group consisting of a hydrogen atom, a halogen atom, a methyl group, a phenoxy group, a nitro group, an acetamide group, and a phenylmethoxy group, and $R_6$ represents a hydrogen atom or a methyl group.

10. The ink jet recording ink according to claim 1, wherein a content of the water-soluble organic solvent represented by Formula (2) above is 5 parts by mass to 200 parts by mass with respect to 100 parts by mass of the dye.

11. The ink jet recording ink according to claim 9, wherein a content of the water-soluble organic solvent represented by Formula (2) above is 5 parts by mass to 200 parts by mass with respect to 100 parts by mass of the dye.

12. The ink jet recording ink according to claim 1, wherein a content of the water-soluble organic solvent represented by Formula (2) above is 10 parts by mass to 150 parts by mass with respect to 100 parts by mass of the dye.

13. The ink jet recording ink according to claim 1, further comprising:

an organic solvent other than the water-soluble organic solvent represented by Formula (2) above, wherein a content of the water-soluble organic solvent represented by Formula (2) above is 1% by mass to 40% by mass with respect to the total mass of the organic solvents.

14. The ink jet recording ink according to claim 9, further comprising: an organic solvent other than the water-soluble organic solvent represented by Formula (2), wherein a content of the water-soluble organic solvent represented by Formula (2) above is 1.2% by mass to 25% by mass with respect to the total mass of the organic solvents.

15. The ink jet recording ink according to claim 14, wherein the organic solvent other than the water-soluble organic solvent represented by Formula (2) above is glycerin, diethylene glycol, a pyrrolidone derivative, or a combination thereof.

16. The ink jet recording ink according to claim 1, wherein the water-soluble organic solvent represented by Formula (2) above is dipropylene glycol monobutyl ether, tripropylene glycol monoethyl ether, propylene glycol monohexyl ether, or tripropylene glycol monohexyl ether.

17. The ink jet recording ink according to claim 15, wherein the water-soluble organic solvent represented by Formula (2) above is dipropylene glycol monobutyl ether, tripropylene glycol monoethyl ether, propylene glycol monohexyl ether, or tripropylene glycol monohexyl ether.

* * * * *